June 13, 1939. C. J. CONN 2,162,213
PROCESS OF FREEZING FOOD PRODUCTS
Filed March 18, 1937   3 Sheets-Sheet 1
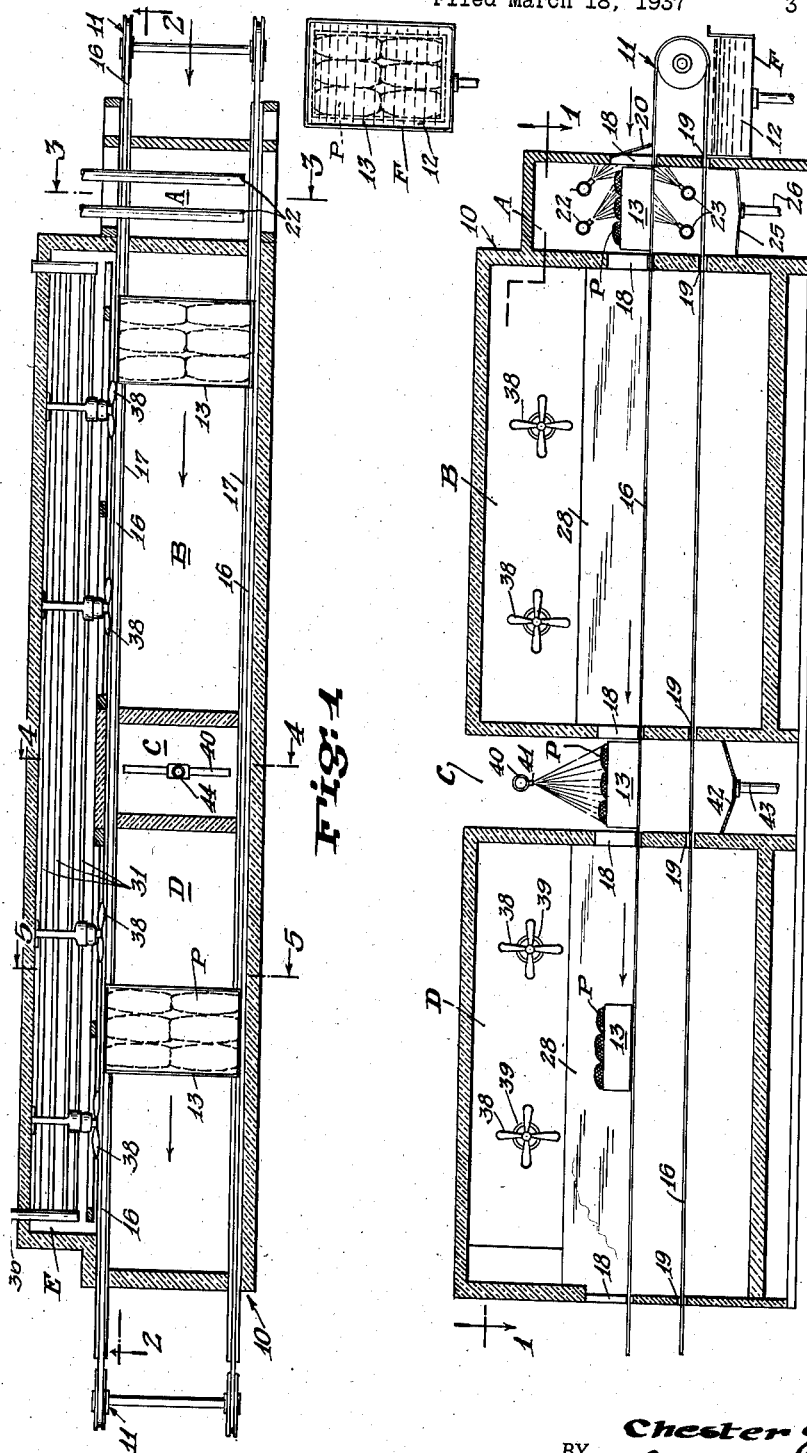
INVENTOR.
Chester J. Conn
BY
ATTORNEY.

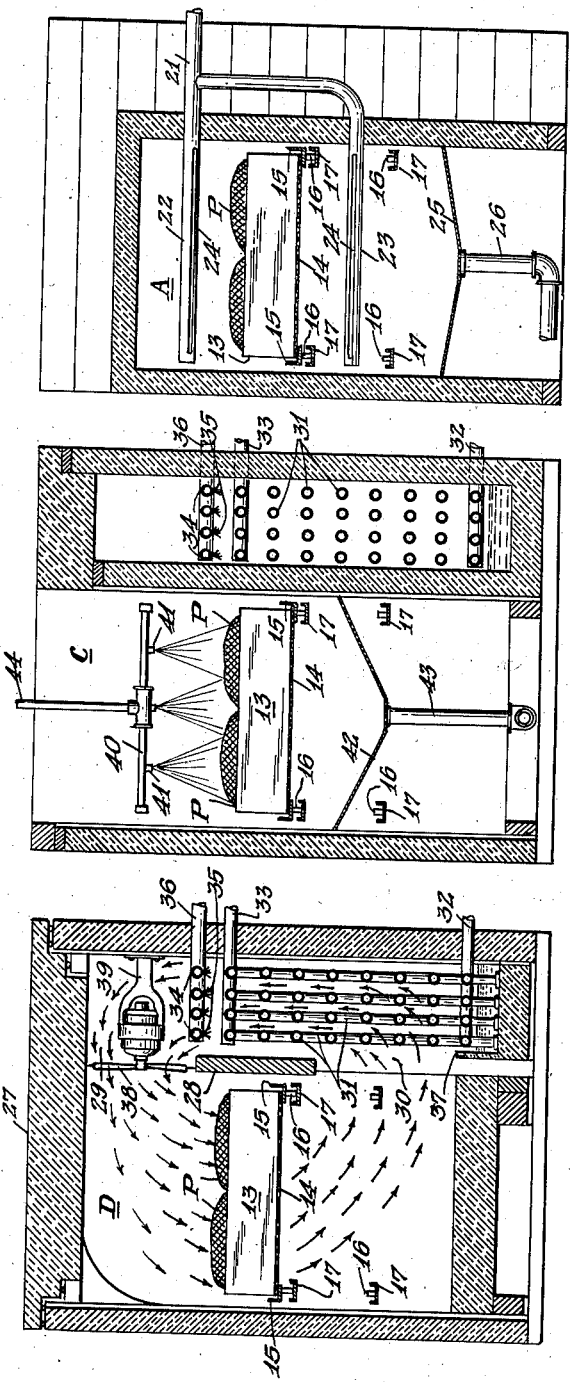

June 13, 1939.   C. J. CONN   2,162,213
PROCESS OF FREEZING FOOD PRODUCTS
Filed March 18, 1937   3 Sheets-Sheet 3

INVENTOR.
Chester J. Conn
BY
ATTORNEY.

Patented June 13, 1939

2,162,213

UNITED STATES PATENT OFFICE

2,162,213

PROCESS OF FREEZING FOOD PRODUCTS

Chester J. Conn, Smithtown Branch, N. Y.

Application March 18, 1937, Serial No. 131,552

4 Claims. (Cl. 99—192)

This invention relates to improvements in methods of and apparatus for treating and preserving frozen food products, being particularly directed to products frozen by brine sprays or the like.

Up to the present time, considerable difficulty has been presented in the preservation of food products quick frozen with spray refrigerant, particularly by virtue of the fact that products such as ducks and poultry, upon freezing with a brine spray, present a surface incrustation formed of salt-ice crystals and blotches at or directly below the surfaces incorporating an agglomeration of solidified fatty substances and salt-ice crystals. The latter formation produces an undesirable spotty appearance in the product and the current method of treatment involving washing of the quick frozen product has been of little effect, except to remove only partially the surface salt incrustation.

Broadly, it is an object of this invention to provide for a treatment of frozen food products, wherein the salt-crystal surface incrustation is removed and the fatty substance-agglomeration on and below the surface membrane of the product is redistributed by dispersion, thereby to present a substantially normal or bloomed surface effect to the product.

Further, it is an object of this invention to subject a quick frozen food product to steps involving quick defrostation and surface freezing through successive treatments, whereby the salt-ice-crystal surface incrustation and/or the fatty substance agglomeration, adjacent or on the surface of the product, are removed or dispersed, thus to present a bloomed product.

Specifically, it is an object of this invention to subject a quick frozen food product to a series of steps involving immersion to provide a solvent for surface incrustations, defrostation to remove the surface incrustations as dissolved and disperse the fatty agglomerations formed at and under the surface, quick surface freezing to provide a bloomed surface and thereafter glazing, such successive steps being carried out in a continuous operation.

These and other advantages, capabilities and features of the invention will appear from the subjoined detailed description of one specific embodiment thereof illustrated in the accompanying drawings, in which Figure 1 is a plan view of the apparatus taken in section along lines 1—1 of Figure 2.

Figure 2 is a front elevation in section of the apparatus taken along lines 2—2 of Figure 1.

Figure 3 is an end elevation in section of the defrosting chamber taken along lines 3—3 of Figure 1.

Figure 4 is an end elevation in section of the wetting chamber taken along lines 4—4 of Figure 1.

Figure 5 is an end elevation in section of the freezing chamber taken along lines 5—5 of Figure 1.

Figure 6:
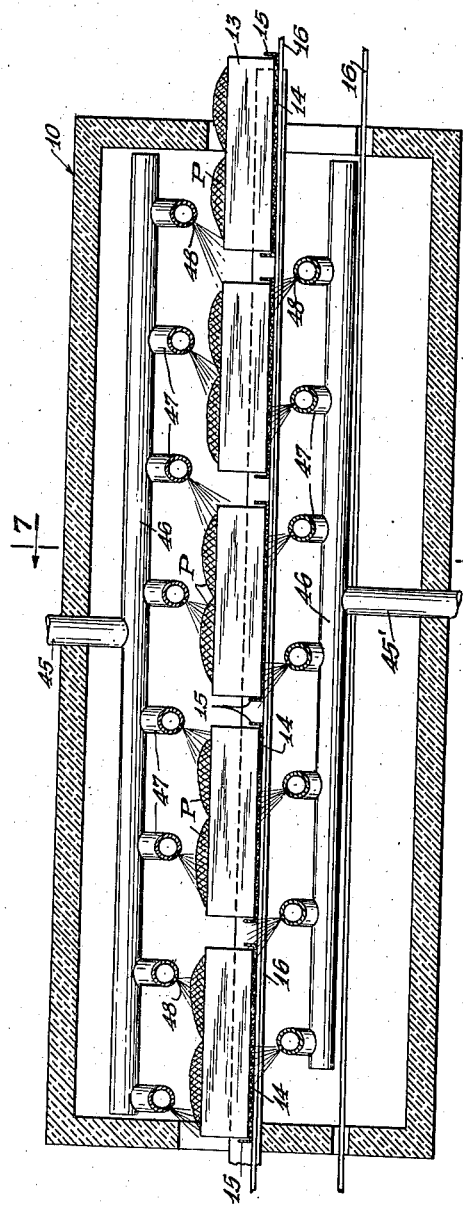
Figure 6 is a front elevation partially in section of a modified form of freezing chamber.

Referring to the reference characters in the drawings, numeral 10 represents an insulated tunnel incorporating a defrosting chamber A, a freezing chamber B, a wetting chamber C, and a glazing chamber D, the respective freezing chambers B and D being contiguous with and having formed as part thereof refrigerating section E. Directly adjacent conveyor line 11 leading through the tunnel, there is disposed an immersion tank F, so that the steps involved in the treatment of the frozen food products are carried out in a continuous operation.

Referring to Figure 1 of the drawings, immersion tank F, which is set substantially at the level of the conveyor 11, has disposed therein treating liquid 12, in this case water, maintained at room temperatures, the water being circulated to permit racks or frames 13 containing frozen food products P to be immersed in substantially clear liquid to dissolve surface salt-ice incrustations and to form a surface film on the products being treated. In the specific embodiment of the rack or frame 13 herein shown, the top is open and the base comprises an open mesh frame 14 having angle bar edges 15 resting on the chain or belt 16 of the conveyor, said chain or belt being carried in channel formation 17, so that upon displacement from the immersion tank it may be disposed for continuous movement through the tunnel.

Referring to Figures 1, 2 and 3, showing the construction of the defrosting chamber A, the same is of insulated wall formation and is disposed at the entrant section of the tunnel. Sections of the walls in the tunnel 10 at 18 and 19 are cut out to form passageways for the belt 16 of the conveyor 11, the sections 18 being provided with a canvas door 20 to seal the respective chambers. A conduit 21 is directed into the chamber A in a manner to provide branches 22 and 23 respectively above and below the upper section of the conveyor belt. An elongated orifice 24, angular with respect to the normal, is directed towards the entrance of the chamber A so that an air blast of about 8 or 10 lbs. at the orifice and at or slightly above room temperature may be directed at the exposed surfaces of the products being carried in the rack or frame 13, a graphic representation of which operation clearly is shown in Figure 2 of the drawings. The floor 25 of this chamber is sloping and has mounted therein a drain pipe 26 for removing liquid dispersed or displaced from the products, the surfaces of which are defrosted by the air blast applied in this chamber.

The frame 13 carrying product P in its continuous movement on the conveyor passes into freezing chamber B, which is interconnected with the refrigerating section E to provide a unit formation as disclosed in Figure 5. The unit has a removable lid 27 at the top to permit access thereto, and is essentially divided in two sections, above defined as B and E, the sections being separated by a baffle formation 28 spaced between the top and bottom of the unit to provide inlet and outlet sections 29 and 30 for the displacement of the air refrigerant in the form of a blast with respect to the freezing chamber B and the refrigerating section E.

The refrigerating section E has disposed therein a series of banked refrigerating coils 31 extending upwardly to a point adjacent the top of the baffle 28 for providing refrigerated air for distribution into freezing chamber B through inlet 29, such refrigerating coils being supplied with refrigerant circulation by a pump, not shown, the pump line being connected to such refrigerating coils by inlet and outlet conduits 32 and 33. Above the uppermost bank of refrigerating coils 31 and at a level just below the top of the baffle 28 are disposed a series of conduits 34 through the orifices 35 of which calcium brine may be sprayed over the refrigerating coils 31 to defrost the same, these conduits being supplied through pipe 36 from an exterior source and being adapted to be used only intermittently for maintaining the refrigerating coils in condition, to provide rapid refrigeration to the air passing upwardly therethrough from outlet 30 after heat exchange with the products passing through chamber B. A wall 37 is provided to define the extremity of the floor of the refrigerating section which is inclined so as to provide a basin for catching the calcium brine and discharging the same out of the unit.

A series of blowers 38 for providing circulation of air, and delivery of refrigerated air into chamber B through inlet 29 are disposed in spaced relationship along the length of chamber B, the same being disposed above baffle 28 and supported on frames 39 carried on the rear wall of the refrigerating section E.

The unit incorporationg freezing chamber B and refrigerating section E is operated in the following manner: food products P passing through the chamber on the conveyor carrying the open ended racks or frames are subjected to air maintained under freezing and preferably at minus ten degrees, the air flow being in the direction of the arrow shown in Figure 5, by virtue of the action of blower 38; the air after heat exchange with the surfaces of food products contacted by it being adapted to pass through opening 30 into the refrigerating section E where, through contact with the refrigerating coils 31 the heat is removed and as cooled the same is drawn upwardly for redistribution by blower 38 into chamber B at the inlet 29 thereof.

The product after passage through refrigerating chamber B enters into the wetting chamber C which, as indicated in Figures 1 and 4 of the drawing, is insulated from the freezer chambers B and D and from the refrigerating section E. As shown in Figures 2 and 4 there is provided in chamber C a conduit 40 having a series of spaced spray nozzles 41 for discharging onto the exposed surfaces of the product P being frozen passing therethrough on the conveyor, liquid, in this instance water, at temperature above freezing, for forming a surface coating or film on the product, the surface of which has been re-frozen in chamber B. The excess spray passes through the screen base of the frame onto sloping floor 42 of the chamber and thence into outlet 43. A conduit 44 from a source of supply not shown leads to the conduit 41.

The surface-wetted product now having a surface film of water passes into glazing chamber D, which is identical with freezing chamber B in construction and operation of the elements therein and temperatures applied. In this chamber the surface film of water is frozen to form a relatively thin icy or glazed surface for the product, after which the same may be removed to storage.

Figure 7:
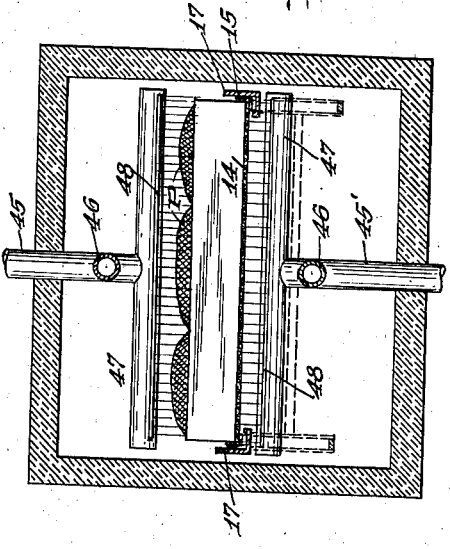
Figure 7 is an end elevation partially in section of the modified form of freezing chamber taken along lines 7—7 of Figure 6.

In the showing in Figures 6 and 7 a modified form of refrigerating and glazing chamber is provided. In applying this modification the refrigerating section E may also be eliminated since the refrigerating and glazing medium comprises an air blast leading from an external source through conduits 45 and 45' into headers 46 above and below the upper conveyor belt section carrying the frozen product P in the rack or frame, so that air under pressure of about 8 lbs. at the orifice may pass through the spaced conduits 47 having elongated discharge slits or orifices 48 disposed in a manner as to deliver refrigerated air under pressure at an angle upon the food products in the frame through the open ends thereof.

It is intended in the event fruits or vegetables of small size are treated to provide for a jogging mechanism associated with the conveyor at a point in advance of the entrance to the defrosting chamber so as to remove excess of water from the products after immersion of the same in tank F, it being of the essence in this procedure to have only a surface film of water on the product passing into the defrosting chamber, so that in the short period of time only a slight defrostation essentially at the surface may be carried on.

Although the respective immersion, defrostation, freezing, wetting and glazing are carried out in the manner and apparatus indicated, it is within the province of this invention to vary the constructional assembly and operative media of this apparatus so long as the effect of the respective steps illustrated is effectuated to bring about the treatment of the nature indicated, wherein and whereby frozen products having either or both of surface incrustations and fatty agglomerations at or adjacent the surface, or frozen products, the surface of which has been affected to introduce variations from natural formation may be treated to provide a bloomed and natural effect and so maintained during storage.

The temperatures in the immersion tank, the defrosting chamber and the wetting chamber are to be maintained at a range substantially at room temperatures but above freezing temperature, the temperature in the respective units being maintained at a value sufficient to bring about respectively the solution of the surface incrustation and moistening of the surface in the immersion tank, the removal by defrostation of the undissolved surface incrustation and the dispersion of the fatty substance agglomerations at or adjacent the surfaces in the defrosting chamber, and the formation of a surface film of water in the wetting chamber during the passage of the food products therethrough. The temperature of the air circulated in the form of a blast in the refreezing and glazing chambers is below freezing and preferably about minus ten degrees Fahrenheit; such temperature being intended to be maintained at a value sufficient respectively to refreeze the surface of the defrosted product in the refreezing chamber and glaze the surface of the wetted product in the glazing chamber during the period of passage of the product through the respective chambers in the tunnel.

It is obvious that various changes and modifications may be made to the details of construction without departing from the general spirit of the invention as set forth in the appended claims.

I claim:

1. A method of treating frozen food products, comprising treating said products successively with warm, edible liquid and an air blast above freezing to defrost the surface of the same, quick freezing the defrosted surface, and thereafter glazing the same.

2. A method of treating frozen food products having surface salt-ice crystal incrustations and fatty substance agglomerations on or adjacent the surface, comprising treating the product successively with warm, edible liquid and air blast above freezing to impart a surface defrostation to the same, whereby the salt-ice crystal formation is removed from the surface and the fatty substance agglomeration dispersed below and into the surface membrane of the product.

3. A method of treating frozen food products, comprising immersing the same in warm, edible liquid above freezing to defrost the surface and the portions of the product thereadjacent, discharging an air blast above freezing upon the product to disperse fatty substance agglomerations on or adjacent the surface, and thereafter quick freezing the thus treated surface with an air blast below freezing temperatures.

4. A method of treating frozen food products, comprising immersing the same in warm, edible liquid above freezing to defrost the surface and the portions of the product thereadjacent, discharging an air blast above freezing upon the product to disperse fatty substance agglomerations on or adjacent the surface, quick freezing the thus treated surface with an air blast below freezing temperatures, applying an edible liquid surface film to the product, and glazing the surface of the product with an air blast.

CHESTER J. CONN.